United States Patent [19]

Asanuma et al.

[11] Patent Number: 5,591,817
[45] Date of Patent: Jan. 7, 1997

[54] MOLDED ARTICLES OF SYNDIOTACTIC POLYPROPYLENE AND METHOD FOR PREPARING SAME

[75] Inventors: Tadashi Asanuma; Tateyo Sasaki; Mitsuru Ito, all of Takaishi; Tetusnosuke Shiomura, Tokyo, all of Japan

[73] Assignee: Mitsui Toatsu Chemicals, Inc., Tokyo, Japan

[21] Appl. No.: 210,082

[22] Filed: Mar. 18, 1994

Related U.S. Application Data

[63] Continuation of Ser. No. 74,274, Jun. 9, 1993, abandoned, which is a continuation of Ser. No. 610,681, Nov. 8, 1990, abandoned.

[30] Foreign Application Priority Data

| Nov. 20, 1989 | [JP] | Japan | 1-299498 |
| Dec. 6, 1989 | [JP] | Japan | 1-315140 |
| Jan. 23, 1990 | [JP] | Japan | 2-11799 |
| Jan. 23, 1990 | [JP] | Japan | 2-11800 |

[51] Int. Cl.$^6$ ........................................... C08F 10/06
[52] U.S. Cl. .................. 526/351; 526/348.2; 526/348.5; 526/348.4; 526/160; 428/332
[58] Field of Search ........................... 526/351, 348.2, 526/348.4, 348.5; 428/502, 503

[56] References Cited

U.S. PATENT DOCUMENTS

| 3,258,455 | 6/1966 | Natta et al. | 526/351 |
| 3,361,728 | 1/1968 | Coen et al. | 526/348.1 |
| 4,892,851 | 1/1990 | Ewen et al. | 526/351 |

FOREIGN PATENT DOCUMENTS

| 414202 | 2/1991 | European Pat. Off. . |
| 419677 | 4/1991 | European Pat. Off. . |
| WO90/12843 | 11/1990 | WIPO . |

OTHER PUBLICATIONS

J. Am. Chem. Soc. 1988, 110, pp. 6255–6256.
World Patent Index Latest, Section Ch. Week 40, Derwent Publications Ltd., London, GB; Class A, AN 83–779353 & JP–A–58 142 818 (Idemitsu Petrochem) Aug. 25, 1983.
World Patent Index Latest, Section Ch. Week 40, Derwent Publications Ltd., London, GB; Class A, AN 86–261852 & JP–A–61 189 920 (Idemitsu Petrochem) Aug. 23, 1986.
Puff et al, Crystalline Olefin Polymer, Pt. II, Interscience Publ. N.Y. vol. XX, (1964) p. 209.

*Primary Examiner*—Edward J. Smith
*Attorney, Agent, or Firm*—Burns, Doane, Swecker & Mathis

[57] ABSTRACT

A molded article of a syndiotactic polypropylene having excellent transparency in which a melting point attributed to the polypropylene having the syndiotactic structure measured at a heating rate of 10° C./minute by differential scanning thermal analysis is represented by a substantially single peak, the aforesaid molded article being prepared by heating, melting and then hot-molding a homopolymer of propylene or a copolymer of propylene and a small amount of another olefin, which have a substantially syndiotactic structure, or a mixture of the homopolymer or the copolymer and a small amount of a polypropylene having a substantially isotactic structure, followed by quenching, or, after these steps, additionally subjecting the above molded article to a heat treatment at a temperature of less than its melting point. A method for preparing the above molded article is also disclosed here.

4 Claims, 1 Drawing Sheet

MOLDED ARTICLES OF SYNDIOTACTIC POLYPROPYLENE AND METHOD FOR PREPARING SAME

This application is a continuation of application Ser. No. 08/074,274, filed Jun. 9, 1993, abandoned, which is a continuation of Ser. No. 07/610,681, filed Nov. 8, 1990, abandoned.

BACKGROUND OF THE INVENTION (i) Field of the Invention

The present invention relates to molded articles of a syndiotactic polypropylene and a method for preparing the same. More specifically, it relates to molded articles having excellent transparency and excellent balance between stiffness and impact resistance which are obtained by molding a syndiotactic polypropylene having a high tacticity, its copolymer or a mixture of the homopolymer or the copolymer and an isotactic polypropylene, and to a method for preparing these molded articles.

(ii) Description of the Related Art

A syndiotactic polypropylene has been known for a long period of time. Such a polypropylene is prepared by polymerization at a low temperature in the presence of a conventional catalyst comprising a vanadium compound, an ether and an organic aluminum compound, but the syndiotactic polypropylene prepared by this process is poor in syndiotacticity and has elastomer-like characteristics. Therefore, it is scarcely considered that the thus prepared polypropylene exerts its inherent syndiotactic characteristics. On the contrary, a polypropylene having good tacticity, i.e., a syndiotactic pentad fraction of more than 0.7 has been discovered for the first time by J. A. Ewen et al. which can be obtained by the use of a catalyst comprising a transition metal compound having an asymmetric ligand and an aluminoxane (J. Am. Chem. Soc., 110, 6255–6256, 1988).

On molding the syndiotactic polypropylene or a copolymer of propylene and another olefin having a substantially syndiotactic structure obtained by the above procedure, molded articles having relatively excellent transparency are obtained, but this transparency is still unsatisfactory.

SUMMARY OF THE INVENTION

The present inventors have intensively conducted research on molded articles of a syndiotactic polypropylene having good transparency with the intention of solving the above-mentioned problem, and as a result, they have found that the molded article obtained by a specific method is extremely excellent in transparency and balance between stiffness and impact resistance.

That is, the present invention is directed to a molded article of a syndiotactic polypropylene having excellent transparency in which the melting point attributed to the polypropylene having a syndiotactic structure measured at a heating rate of 10° C./minute by differential scanning thermal analysis is represented by a substantially single peak, the aforesaid molded article being prepared by heating, melting and then hot-molding a homopolymer of propylene or a copolymer of propylene and a small amount of another olefin, which have a substantially syndiotactic structure, or a mixture of the homopolymer or the copolymer and a small amount of a polypropylene having a substantially isotactic structure, followed by quenching, or, after these steps, additionally subjecting the above molded article to a heat treatment at a temperature of less than its melting point. Furthermore, the present invention is directed to a method for preparing a molded article of a syndiotactic polypropylene having good transparency which comprises the steps of heating, melting and then hot-molding a homopolymer of propylene or a copolymer of propylene and a small amount of another olefin, which have a substantially syndiotactic structure, or a mixture of the homopolymer or the copolymer and a small amount of a polypropylene having a substantially isotactic structure, and then quenching the resulting molded article at 100° C./minutes or more, or if necessary, after the quenching, additionally effecting a heat treatment at a temperature of less than its melting point.

In the present invention, the above-mentioned homopolymer of propylene having a substantially syndiotactic structure means a polymer in which its syndiotactic pentad fraction is 0.5 or more, preferably 0.7 or more. Furthermore, the above-mentioned copolymer of propylene and a small amount of the other olefin having a substantially syndiotactic structure means a copolymer in which its $^{13}$C-NMR spectrum, a peak intensity at 20.2 ppm occupies 0.3 or more, preferably 0.5 or more of the total intensity of all the peaks attributed to the methyl groups of propylene units. The manner of calculating the aforesaid syndiotactic pentad fraction is described in A. Zambelli et al., Macromolecules, Vol. 8, 687 (1975) and the same, Vol. 6, 925 (1973). The $^{13}$C-NMR spectrum can be obtained by measuring a 1,2,4-trichlorobenzene solution of the polymer on the basis of tetramethylsilane.

The molded article of the present invention has extremely good transparency and an excellent balance of physical properties between stiffness and impact resistance. Therefore it is industrially highly valuable in various applications particularly such as films and sheets.

DETAILED DESCRIPTION OF THE INVENTION

Figure 1:
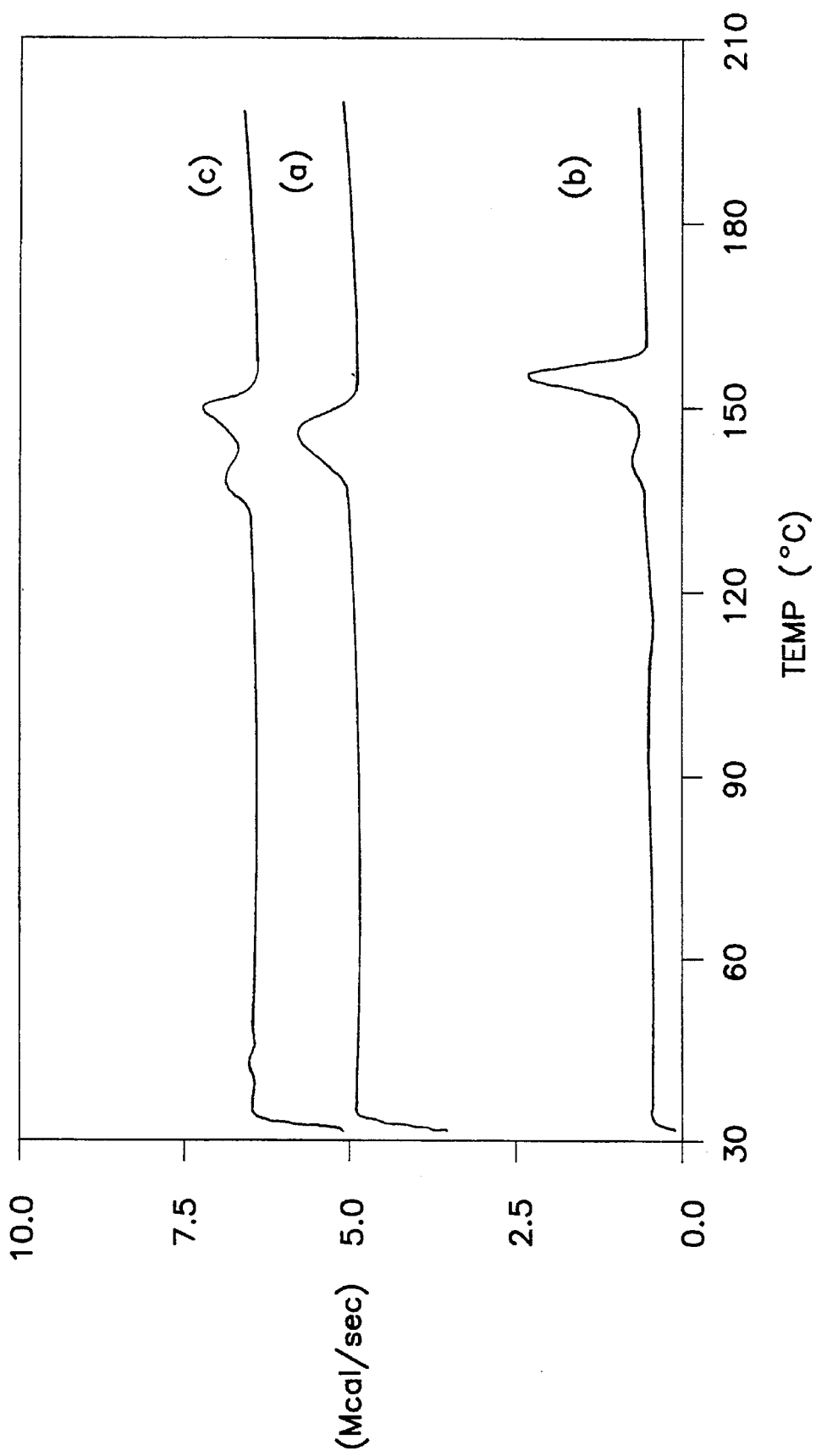
FIG. 1 shows melting states of polymers in analyzing molded articles in Example 1 and Comparative Example 1 by differential scanning thermal analysis. In this drawing, curve (a) is concerned with the polymer prior to a heat treatment in Example 1, curve (b) with the polymer subsequent to the heat treatment in Example 1, and curve (c) with the polymer in Comparative Example 1.

In the present invention, as catalysts for the manufacture of a homopolymer of propylene or a copolymer of propylene and a small amount of another olefin, which have a substantially syndiotactic structure, compounds described in the above-mentioned literature can be used. In addition, other catalysts having different structures can also be used, as long as they can provide a polypropylene having a syndiotactic pentad fraction of 0.7 or more when propylene is singly polymerized.

Examples of the transition metal compound having an asymmetric ligand include isopropyl(cyclopentadienyl-1-fluorenyl)hafnium dichloride and isopropyl(cyclopentadienyl-1-fluorenyl)zirconium dichloride mentioned in the above-mentioned literature as well as other transition metal compounds in which at least one chlorine atom is replaced with an alkyl group.

Examples of the aluminoxane include compounds represented by the general formula

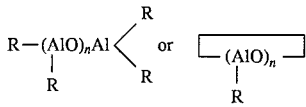

(wherein R is a hydrocarbon residue having 1 to 3 carbon atoms). In particular, what is suitably used is the aluminoxane in which R is a methyl group and n is 5 or more, preferably from 10 to 100.

The amount of the aluminoxane to be used is from 10 to 1,000,000 mole times, usually from 50 to 5,000 mole times as much as that of the transition metal compound. No particular restriction is put on polymerization conditions, and various polymerization techniques are utilizable such as solvent polymerization using an inert solvent, bulk polymerization in which there is substantially no inert solvent, and gas phase polymerization. Usually, the polymerization temperature is from $-100°$ to $200°$ C. and the polymerization pressure is from atmospheric pressure to 100 kg/cm$^2$-G. Preferably the temperature is from $-100°$ to $100°$ C. and the pressure is from atmospheric pressure to 50 kg/cm$^2$-G.

The other olefin used in the copolymerization is ethylene or an $\alpha$-olefin having 4 to 20 carbon atoms, and typical examples of this kind of olefin include butene-1, pentene-1, hexene-1, octene-1 and 4-methylpentene-1. In the copolymerization, the other olefin is used usually in an amount of 20% by weight or less with respect to propylene. When the amount of the other olefin is in excess of 20% by weight, the stiffness of the molded article undesirably deteriorates. No particular restriction is put on conditions for the copolymerization, and known copolymerization conditions which are usually used can be employed without any modification. If the polymerization is carried out in a substantially one-step polymerization manner, the resulting polymer has a narrow molecular weight distribution, and the ratio between the weight average molecular weight and the number average molecular weight of the polymer (hereinafter referred to simply as "MW/MN") which are measured by a gel permeation chromatography at 135° C. is usually from about 1.5 to about 3.5. However, when two kinds of transition metal compounds (it is effective to use two kinds of metals such as zirconium and hafnium) are used in the polymerization, or when two kinds of polymers having different molecular weights are mixed after polymerization, a polymer having a wide molecular weight distribution, i.e., NM/MN of 3.5 or more can be prepared. Such a polymer can be preferably utilized in the present invention. The preferable molecular weight of the polymer is usually such that its intrinsic viscosity (hereinafter referred to simply as "$\eta$") measured in a tetralin solution at 135° C. is from about 0.5 to about 5.0. Furthermore, a part of the syndiotactic polypropylene, e.g., less than 50% by weight may be replaced with polypropylene having an isotactic structure, and in this case, a molded article having high stiffness can be obtained.

The above-mentioned synditotactic polypropylene or mixture is heated, molted and then hot-molded into a predetermined shape. No restriction is put on the molding process as long as quenching can be effected after the molding step, and extrusion molding or injection molding can be employed.

It is important that the molded article which is still in a molten state is quenched at a rate of 100° C./minute or more, preferably 150° to 1,000° C./minute. A usual means for the quenching is to bring the molded article into contact with a refrigerant, but another quenching means may also be used which comprises introducing the melted resin into an atmosphere at a relatively low temperature. This quenching operation permits a substantially single peak to represent the melting point of the molded article attributed to the polypropylene having a syndiotactic structure measured at a heating rate of 10° C./minute by differential scanning thermal analysis. On the contrary, if the melted article is slowly cooled at a rate of less than 100° C./minute and the measurement is then made at the same heating rate as described above by differential scanning thermal analysis, the melting point of the articles is not represented by the single peak but by two or more peaks, as on curve (c) in FIG. 1. In addition, the molded article which has undergone the above-mentioned slow cooling is poor in transparency, as seen in Comparative Examples 1 and 5 which will be hereinafter described. In this connection, the position of the melting point of the quenched article represented by the substantially single peak is usually observed on a lower temperature side than the maximum peak of 2 or 3 peaks which appear in case the measurement is made under usual conditions, i.e., by melting the molded article at 250° C., dropping their temperature to 30° C. at 10° C./minute, and then elevating the temperature again at 10° C./minute by the differential scanning thermal analysis.

Needless to say, it is possible to mix in advance a crystallization nucleating agent in preparing the molded article of the present invention.

With regard to the quenched article, transparency is extremely excellent, but stiffness is poorer as compared with usual molded articles. However, if the quenched article is heated at a temperature of less than the melting point of the article, the stiffness of the molded article can be noticeably improved without impairing the transparency. This heat treatment can be effected in a short period of time, if a high temperature is employed. However, the heating temperature is usually from 50° C. to the melting point of the molded article, and the heating time is in the range of from several seconds to several hours. The employment of the relatively high temperature permits shortening of the treating time. Usually, conditions of about 100° C. and several hours are on a suitable level.

Now, the present invention will be described in more detail in reference to examples. However, the invention is not to be construed as being limited to the particular embodiments disclosed.

EXAMPLE 1

First, 0.2 g of isopropyl(cyclopentadienyl-1-fluorenyl)zirconium dichloride and 30 g of methylaluminoxane (polymerization degree 16.1) made by Toyo Akuzo Co., Ltd. were added to 80 liters of toluene in a 200-liter autoclave. The isopropyl(cyclopentadienyl-1-fluorenyl)zirconium dichloride was obtained by introducing lithium into isopropylcyclopentadienyl-1-fluorene synthesized in an ordinary manner, reacting the same with zirconium tetrachloride, and then recrystallizing the resultant reaction product. Afterward, propylene was polymerized at 20° C. under a polymerization pressure of 3 kg/cm$^2$-G for 2 hour in order to obtain a polymer. This polymer was then subjected to a deashing treatment with methanol and methyl acetoacetate, followed by washing with an aqueous hydrochloric acid solution. The thus washed polymerization mixture was then filtered in order to obtain 5.6 kg of a syndiotactic polypropylene. According to a $^{13}$C-NMR analysis, the syndiotactic pentad fraction of this polypropylene was 0.935, and $\eta$ which was measured in a tetralin solution at 135° C. was 1.45. Furthermore, the ratio MW/MN measured in 1,2,4-trichlorobenzene was 2.2.

A known stabilizer was then added to this polypropylene, and grains were formed therefrom by an extruder. Next, the grains were melt-pressed at 200° C. to obtain a sheet having a thickness of 1 mm, and the sheet was then thrown into water at 0° C. so as to quench the sheet. In this quenching step, a temperature drop rate was measured by a sensor embedded in the center of the sheet, and it was 250° C./minute. The physical properties of this sheet were then measured, and the results are as follows:

| | |
|---|---|
| Flexural stiffness: kg/cm$^2$ | ASTM D-747 (23° C.) |
| Tensile yield strength: kg/cm$^2$ | ASTM D-638 (23° C.) |
| Elongation at breakage: % | ASTM D-638 (23° C.) |
| Izod impact strength (notched): kg · cm/cm strength (notched): | ASTM D-638 (23° C., −10° C.) |
| Haze: % | ASTM D1003 |

The flexural stiffness, the tensile yield strength, the elongation at breakage and the Izod impact strength (23° C., −10° C.) were 5,800, 240, 507, 45 and 3.6, respectively, and the haze was 21. Furthermore, melting behavior was measured by elevating the temperature of the sheet at 10° C./minute in accordance with differential scanning thermal analysis, and the results are shown by curve (a) in FIG. 1, in which the melting point attributed to a syndiotactic structure is indicated by a substantially single peak.

The above-mentioned sheet was then subjected to a heat treatment at a controlled temperature of 145° C. for 30 minutes in an electric furnace. As a result, the physical properties of the sheet were improved in terms of flexural stiffness and tensile yield strength. That is, the flexural stiffness, the tensile yield strength, the elongation at breakage and the Izod impact strength (23° C., −10° C.) were 6,800, 280, 43, 45 and 3.4, respectively, and the haze was 24. Furthermore, the melting behavior was measured by increasing the temperature at 10° C./minute in accordance with the differential scanning thermal analysis, and the results are shown by curve (b) in FIG. 1.

COMPARATIVE EXAMPLE 1

The same procedure as in Example 1 was followed except that the pressed sheet was cooled under usual conditions, i.e., at 80° C./minute, and the physical properties of the sheet were then measured. As a result, flexural stiffness, tensile yield strength, elongation at breakage and Izod impact strength (23° C., −10° C.) were 6,200, 261, 520, 12.7 and 3.6, respectively, and haze was 56. Furthermore, melting behavior was measured under the same conditions as in Example 1 in accordance with a differential scanning thermal analysis, and the results are shown by curve (c) in FIG. 1.

The above-mentioned sheet was then subjected to a heat treatment at 145° C. for 30 minutes, and the physical properties of the thus treated sheet were measured. As a result, the flexural stiffness was 6,400, the tensile yield strength was 265, the elongation at breakage was 180, and the Izod impact strength (23° C., −10° C.) were 12.7 and 3.4, respectively. As can be understood from the above, the physical properties were improved to some extent by the heat treatment, but the haze was 61, which meant that it was still poor.

EXAMPLE 2

The same procedure as in Example 1 was followed except that hexene-1 was allowed to coexist during polymerization, in order to obtain a copolymer containing 6% by weight of hexene. According to $^{13}$C-NMR analysis, the peak intensity of this copolymer at 20.2 ppm occupied 0.75 of the total intensity of all the peaks attributed to the methyl group of the propylene unit, which meant that the obtained copolymer had a substantially syndiotactic structure. The copolymer was then heated, melted and hot-molded in the same manner as in Example 1, and afterward quenching was effected to obtain a sheet. For this sheet, the physical properties were then measured. As a result, flexural stiffness, tensile yield strength, elongation at breakage and Izod impact strength (23° C., −10° C.) were 4,800, 200, 633, 45 and 3.8, respectively, and haze was 15. Furthermore, a melting point attributed to the polypropylene having a syndiotactic structure was measured by elevating the temperature of the sheet at 10° C./minute in accordance with differential scanning thermal analysis, and the thus measured melting point was represented by a substantially single peak.

The above-mentioned sheet was further subjected to a heat treatment at 110° C. for 60 minutes, and the physical properties were then measured. As a result, the flexural stiffness, the tensile yield strength, the elongation at breakage and the Izod impact strength (23° C., −10° C.) were 5,100, 230, 520, 45 and 3.2, respectively, and the haze was 18.

COMPARATIVE EXAMPLE 2

The same procedure as in Example 2 was followed except that a pressed sheet was cooled under usual conditions, i.e., at 85° C./minute, and the physical properties of the sheet were then measured. As a result, flexural stiffness, tensile yield strength, elongation at breakage and Izod impact strength (23° C., −10° C.) were 5,000, 210, 585, 13.5 and 3.7, respectively, and haze was 47.

EXAMPLE 3

First, 0.1 g of isopropyl(cyclopentadienyl-1-fluorenyl)hafnium dichloride, 0.1 g of isopropyl(cyclopentadienyl-1-fluorenyl)zirconium dichloride synthesized in Example 1 and 30 g of methylaluminoxane (polymerization degree 16.1) made by Toyo Akuzo Co., Ltd. were added to 80 liters of toluene in a 200-liter autoclave. The isopropyl(cyclopentadienyl-1-fluorenyl)hafnium dichloride was that which had been obtained by introducing lithium into isopropylcyclopentadienyl-1-fluorene synthesized in an ordinary manner, reacting the same with hafnium tetrachloride (containing 5% by weight of zirconium), and then recrystallizing the resultant reaction product. Afterward, propylene was polymerized at 20° C. under a polymerization pressure of 3 kg/cm$^2$-G for 2 hour in order to obtain a polymer. This polymer was then subjected to a deashing treatment with methanol and methyl acetoacetate, followed by washing with an aqueous hydrochloric acid solution. The thus washed polymerization mixture was then filtered in order to obtain 4.6 kg of a syndiotactic polypropylene. According to a $^{13}$C-NMR analysis, the syndiotactic pentad fraction of this polypropylene was 0.904, and its η was 1.68 and its MW/MN was 5.2. Afterward, grains were formed from this polypropylene by an extruder as in Example 1. The grains were then melt-pressed at 200° C. to obtain a sheet having a thickness of 1 mm, and the sheet was thrown into water at 0° C. so as to quench the sheet. In this quenching step, a temperature drop rate was measured by a sensor embedded in the center of the sheet and it was 250° C./minute. The physical properties of this sheet were then measured, and flexural stiffness, tensile yield strength, elongation at breakage and Izod impact strength (23° C., −10° C.) were 5,200, 210, 480, 45 and 3.8, respectively, and haze was 8.5. Next, a melting point attributed to the polypropylene having a syndiotactic structure was measured by increasing the temperature of the sheet at 10° C./minute in accordance with differential scanning thermal analysis, and it was apparent that the melting point was represented by a substantially single peak and it was 135.3° C. Furthermore, the above-mentioned sheet was subjected to a heat treatment at a controlled temperature of 130° C. for 30 minutes in an electric furnace. As a result, the physical properties of the sheet were improved in terms of flexural stiffness and tensile yield strength, as mentioned below. The flexural stiffness, the tensile yield strength, the elongation at breakage and the Izod impact strength (23° C., −10° C.) were 5,800, 245, 43, 45 and 3.8, respectively, and the haze was 10.3.

COMPARATIVE EXAMPLE 3

The same procedure as in Example 3 was followed except that the pressed sheet was cooled under usual conditions, i.e., at 80° C./minute, and the physical properties of the sheet were then measured. As a result, flexural stiffness, tensile yield strength, elongation at breakage and Izod impact strength (23° C., −10° C.) were 5,250, 210, 420, 12.7 and 3.6, respectively, and haze was 58.

EXAMPLE 4

The same procedure as in Example 3 was followed except that hexene-1 was allowed to coexist during polymerization, in order to obtain a copolymer containing 6% by weight of hexene. According to a $^{13}$C-NMR analysis, the peak intensity at 20.2 ppm of this copolymer occupied 0.68 of the total intensity of all the peaks attributed to the methyl groups of the propylene units. This fact indicates that the obtained copolymer has a substantially syndiotactic structure. In addition, MW/MN was 4.5. The copolymer was then heated, melted and hot-molded in the same manner as in Example 3, and afterward quenching was effected to obtain a sheet. For this sheet, physical properties were measured. As a result, flexural stiffness, tensile yield strength, elongation at breakage and Izod impact strength (23° C., −10° C.) were 4,600, 190, 640, 45 and 3.8, respectively, and haze was 16. Furthermore, a melting point attributed to the polypropylene having a syndiotactic structure was measured by increasing the temperature of the sheet at 10° C./minute in accordance with differential scanning thermal analysis, and the thus measured melting point was represented by a substantially single peak.

The above-mentioned sheet was further subjected to a heat treatment at 110° C. for 60 minutes, and physical properties were then measured. Consequently, the flexural stiffness, the tensile yield strength, the elongation at breakage and the Izod impact strength (23° C., −10° C.) were 5,100, 240, 490, 45 and 3.3, respectively, and the haze was 17.

COMPARATIVE EXAMPLE 4

The same procedure as in Example 4 was followed except that the pressed sheet was cooled under usual conditions, i.e., at 85° C./minute. With regard to physical properties of the sheet, flexural stiffness, tensile yield strength, elongation at breakage and Izod impact strength (23° C., −10° C.) were 5,100, 220, 460, 18.5 and 3.7, respectively, and haze was 44.

EXAMPLE 5

Ten parts by weight of a commercially available isotactic polypropylene (isotactic pentad fraction 0.962, and η 1.62) was mixed with 90 parts by weight of the syndiotactic polypropylene obtained in Example 3. The MW/MN of the resulting mixture was 7.5. This mixture was then heated, melted and hot-molded in the same manner as in Example 1, followed by quenching, in order to form a sheet. Afterward, for the thus formed sheet, the physical properties were measured, and flexural stiffness, tensile yield strength, elongation at breakage and Izod impact strength (23° C., −10° C.) were 6,800, 260, 150, 14.5 and 3.0, respectively, and haze was 24. The melting point of the sheet was measured by a differential scanning thermal analyzer as in Example 3. In this case, the melting point attributed to the polypropylene having a syndiotactic structure was represented by a substantially single peak and it was 145.5° C., and the melting point attributed to the polypropylene having an isotactic structure was 162.0° C. Furthermore, the above-mentioned sheet was subjected to a heat treatment at a controlled temperature of 145° C. for 30 minutes in an electric furnace. As a result, the flexural stiffness and tensile yield strength of the sheet were improved. That is, the flexural stiffness, the tensile yield strength, the elongation at breakage and the Izod impact strength (23° C., −10° C.) were 7,900, 295, 45, 15.4 and 3.1, respectively, and the haze was 25.

COMPARATIVE EXAMPLE 5

The same procedure as in Example 5 was followed except that the pressed sheet was cooled under usual conditions, i.e., at 80° C./minute. With regard to the physical properties of the sheet, flexural stiffness, tensile yield strength, elongation at breakage and Izod impact strength (23° C., −10° C.) were 7,300, 268, 64, 13.3 and 2.8, respectively, and haze was 75.

What is claimed is:

1. A molded article of a syndiotactic polypropylene having excellent transparency in which the melting point attributed to the polypropylene having a syndiotactic structure measured at a heating rate of 10° C./minute by differential scanning thermal analysis is represented by a substantially single peak, said molded article being prepared by heating, melting and then hot-molding (a) a homopolymer of propylene, which has a syndiotactic structure such that the syndiotactic pentad fraction is 0.7 or more, (b) a copolymer of propylene and a small amount of another olefin, which has a syndiotactic structure such that, in a $^{13}$C-NMR spectrum of the copolymer, a peak intensity at 20.2 ppm occupies 0.5 or more of the total intensity of all the peaks attributed to the methyl groups of propylene units, or (c) a mixture of said homopolymer or said copolymer and less than 50% by weight of the mixture of a polypropylene having a substantially isotactic structure, followed by quenching.

2. A molded article of a syndiotactic polypropylene having excellent transparency prepared by heating, melting and then hot-molding (a) a homopolymer of propylene, which has a syndiotactic structure such that the syndiotactic pentad fraction is 0.7 or more, (b) a copolymer of propylene and a small amount of another olefin, which has a syndiotactic structure such that, in a $^{13}$C-NMR spectrum of the copolymer, a peak intensity at 20.2 ppm occupies 0.5 or more of the total intensity of all the peaks attributed to the methyl groups of propylene units, or (c) a mixture of said homopolymer or said copolymer and less than 50% by weight of the mixture of a polypropylene having a substantially isotactic structure;

quenching to obtain a molded article in which the melting point attributed to the polypropylene having a syndiotactic structure measured at a heating rate of 10° C./minute by differential scanning thermal analysis is represented by a substantially single peak; and then subjecting said molded article to heat treatment at a temperature of less than the melting point thereof.

3. A molded article of a syndiotactic polypropylene having excellent transparency in which a melting point measured at a heating rate of 10° C./minute by differential scanning thermal analysis is represented by a substantially single peak, said molded article being prepared by heating, melting and then hot-molding (a) a homopolymer of propylene, which has a syndiotactic structure such that the syndiotactic pentad fraction is 0.7 or more, or (b) a copolymer of propylene and a small amount of another olefin, which has a syndiotactic structure such that, in a $^{13}$C-NMR spectrum of the copolymer, a peak intensity at 20.2 ppm occupies 0.5 or more of the total intensity of all the peaks attributed to the methyl groups of propylene units, the ratio between the weight average molecular weight and the number average molecular weight of said polymer being from 1.5 to 3.5, and then quenching the resulting molded article.

4. A molded article of a syndiotactic polypropylene having excellent transparency which is prepared by heating, melting and then hot-molding (a) a homopolymer of propylene, which has a syndiotactic structure such that the syndiotactic pentad fraction is 0.7 or more, or (b) a copolymer of propylene and a small amount of another olefin, which has a syndiotactic structure such that, in a $^{13}$C-NMR spectrum of the copolymer, a peak intensity at 20.2 ppm occupies 0.5 or more of the total intensity of all the peaks attributed to the methyl groups of propylene units, the ratio between the weight average molecular weight and the number average molecular weight of said polymer being from 1.5 to 3.5; quenching to obtain a molded article in which a melting point measured at a heating rate of 10° C./minute by differential scanning thermal analysis is represented by a substantially single peak; and then subjecting said molded article to a heat treatment at a temperature of less than the melting point thereof.

\* \* \* \* \*

UNITED STATES PATENT AND TRADEMARK OFFICE
CERTIFICATE OF CORRECTION

PATENT NO.   : 5,591,817

DATED:       : January 7, 1997

INVENTOR(S) : Tadashi ASANUMUA et al

It is certified that error appears in the above-identified patent and that said Letters Patent is hereby corrected as shown below:

On the title page: Item [75]

The third inventors name should read as follows:

-- TETSUNOSUKE SHIOMURA --.

Signed and Sealed this

Seventeenth Day of June, 1997

Attest:

BRUCE LEHMAN

Attesting Officer        Commissioner of Patents and Trademarks